May 31, 1932. E. E. WICKERSHAM 1,860,519
HARVESTER
Original Filed Nov. 8, 1927
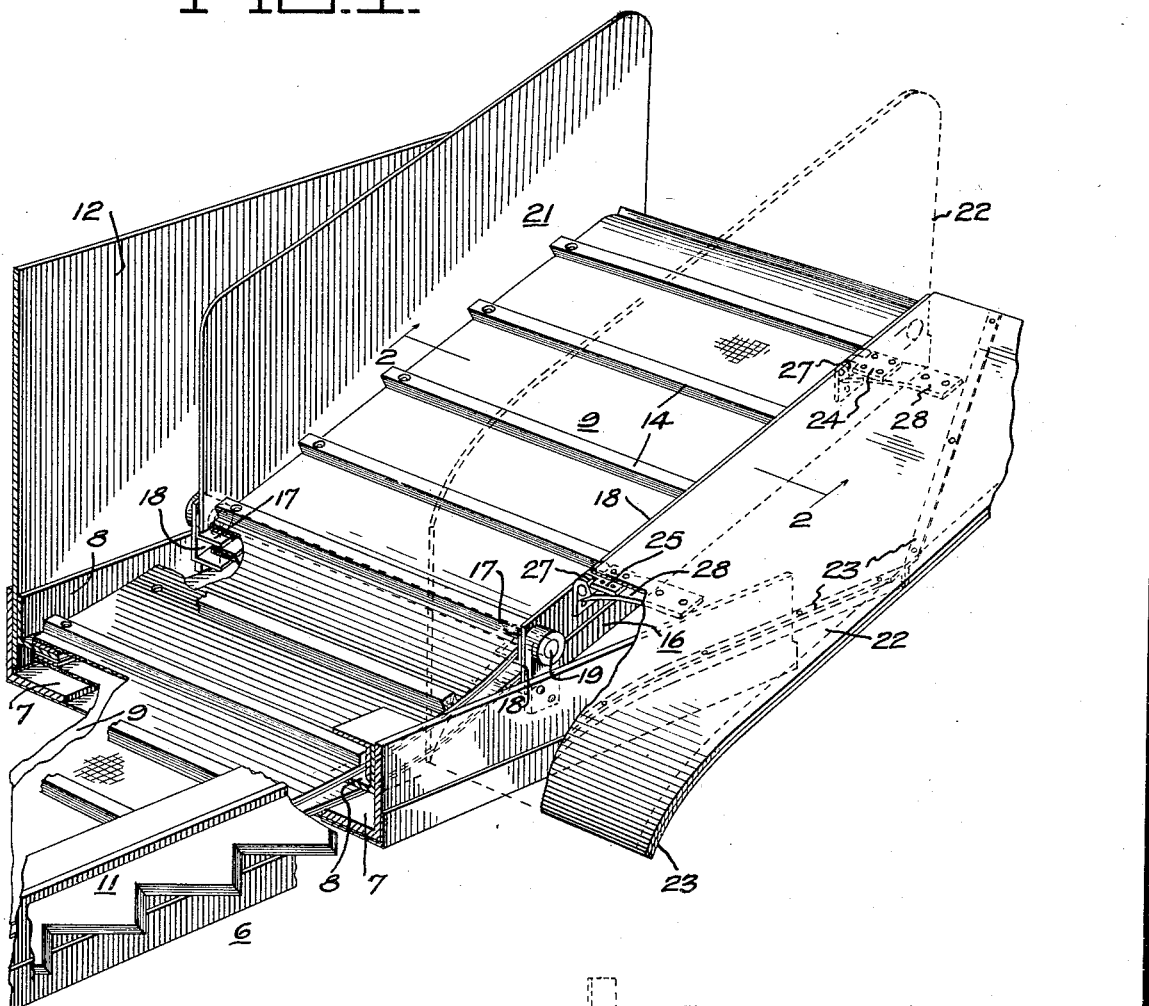
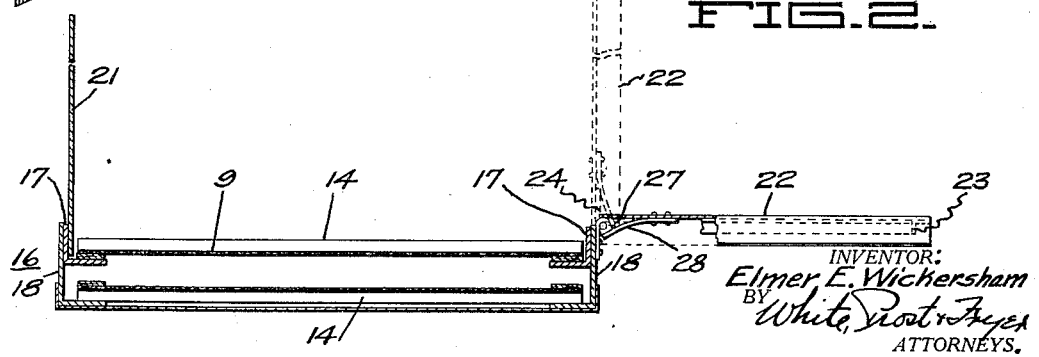
INVENTOR:
Elmer E. Wickersham
BY White, Prost & Fryer
ATTORNEYS.

Patented May 31, 1932

1,860,519

UNITED STATES PATENT OFFICE

ELMER E. WICKERSHAM, OF SAN LEANDRO, CALIFORNIA, ASSIGNOR, BY MESNE ASSIGNMENTS, TO CATERPILLAR TRACTOR CO., OF SAN LEANDRO, CALIFORNIA, A CORPORATION OF CALIFORNIA

HARVESTER

Application filed November 8, 1927, Serial No. 231,975. Renewed June 21, 1930.

My invention relates to harvesting machinery and is particularly pertinent to headers provided with spouts for discharging the cut grain.

In most headers, there is provided a traveling belt known as a draper, for receiving cut grain and either conveying it thru a draper extension or spout to the separator unit of a combined harvester or discharging it on the ground in windrows, in which latter instance the mechanism is usually termed a windrow header. It is customary that the grain being carried be confined to the spout by sides which form an open trough or U-shaped channel with the draper at the bottom thereof. The sides are especially useful in restricting light fluffy grain to the draper, and are eminently satisfactory when the length of the grain is less than the width of the draper. But for grains which grow to a considerable height and particularly when long clover is being handled, congestion occurs on the draper, particularly in the spout, due to the inability of the grain or clover to extend across the draper without interfering with the spout sides.

It is therefore an object of my invention to provide a spout which will accommodate extra long grain or clover as well as normal or short grain.

My invention possesses other advantageous features, some of which with the foregoing will be set forth at length in the following description where I shall outline in full that form of the spout side of my invention which I have selected for illustration in the drawings accompanying and forming part of the present specification. In said drawings I have shown one form of spout side embodying my invention, but it is to be understood that I do not limit myself to such form since the invention, as set forth in the claims, may be embodied in a plurality of forms.

In the drawings:

Fig. 1 shows in perspective, with portions broken away, the spout of a header according to my invention.

Fig. 2 is a cross section, the plane of which is indicated by the line 2—2 of Fig. 1.

In its preferred form, the spout side of my invention is preferably mounted on the spout in such a manner that it can be positioned to form an enclosure of the draper or can be positioned to form an extension of the draper for the passage of long grain or clover.

In the embodiment of my invention disclosed in the drawings, the header usually includes a framework 6 conveniently made of nested angle irons 7 and 8 providing channels in which the upper run and lower run of a draper 9 are guided. The angles 7 and 8 are preferably parallel and ordinarily extend substantially horizontally. At the leading edge of the framework 6 is usually mounted a mowing device such as a sickle 11 which cuts the standing grain or clover and permits it to fall on the draper. The rear side of the header ordinarily is provided with a backboard 12 upstanding from the framework and designed to confine the grain or clover to the draper.

The draper itself comprises a belt, generally of canvas or similar fabric, on which at intervals are affixed sticks 14. The draper is usually passed over a roller at each end and is propelled by suitable mechanism, not shown. The discharge end of the draper preferably is supported by a spout framework 16 usually including two pairs of nested angles 17 and 18 joined together. These are ordinarily disposed to continue the angles 7 and 8. The spout framework is preferably hinged to the header framework 6 on a transverse rod 19 passing between the upper and lower runs of the draper 9. The backboard 12 is continued in the spout by a spout side 21 fastened to the framework 16 and sliding over the backboard when the spout is raised and lowered around rod 19. In conventional constructions, a similar side is arranged parallel to the spout side 21 and on the leading edge of the draper to aid in confining the grain traveling on the draper.

In accordance with my invention I preferably provide a different sort of spout side on the leading edge of the header. This spout side usually is a plate 22 of sheet metal reenforced by suitable angles 23 and is secured to the spout framework 16 by hinges 24 and 25. The hinge axis is substantially in the same plane that the upper run of the draper 9 occupies. This movable spout side can optionally be positioned upstanding from the framework 16, as shown by the dotted lines of Fig. 1, or it can be positioned in substantially a horizontal plane to form a continuation of the upper run of the draper as is shown by the full lines in Fig. 1. For retaining the side 22 in either extreme position, there is preferably provided a cam surface 27 on one of the hinges against which a stiff leaf spring 28 bears. The side cannot be accidentally jarred from position but can easily be adjusted. The ingress of grain to the spout is facilitated in either position of the hinged side by a flaring leading edge of the plate 22.

In the usual position of the spout side, the plate 22 extends upwardly, and short and normal grain is properly confined and protected from wind. When the machine is operated in long grain and especially in long clover, the movable spout side is rotated on the hinges 24 and 25 into a substantially horizontal position to form an extension of the upper run of the draper. The long grain or clover then can extend over the draper and be supported by the spout side.

I claim:

1. In a header, a spout framework, a draper arranged to run on said framework, a sheet metal spout side pivoted on said framework to form a coplanar extension of said draper, the leading edge of said spout side being flared, hinges connecting the spout sides with the framework, and resilient means acting on the hinges to position the spout side.

2. In a header, a spout framework, a spout side at one side of the framework, a second spout side having a flared leading edge movably connected with the opposite side of the framework, hinges connecting the second spout side with the framework to permit the second spout side to swing on the frame, said hinges having cams formed thereon, and leaf springs adapted to engage the cams to position the spout side with respect to the framework.

3. In a header, a channel iron spout framework, a draper arranged to run on the framework, a reinforced sheet metal spout side having a flared leading edge pivoted on the framework adjustable between a perpendicular and a horizontal position with respect to the framework and hinges connecting the spout side and the framework, said hinges having a cam surface formed thereon, and leaf springs mounted on the spout side and engaging the cam surfaces of the hinges to position the spout side with respect to the framework.

In testimony whereof, I have hereunto set my hand.

ELMER E. WICKERSHAM.